United States Patent
Baird et al.

(10) Patent No.: US 7,570,601 B2
(45) Date of Patent: Aug. 4, 2009

(54) HIGH SPEED AUTOTRUNKING

(75) Inventors: Brian Baird, Pleasanton, CA (US); Daniel Talayco, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 521 days.

(21) Appl. No.: 11/099,474

(22) Filed: Apr. 6, 2005

(65) Prior Publication Data

US 2006/0227735 A1 Oct. 12, 2006

(51) Int. Cl.
*H04L 12/28* (2006.01)

(52) U.S. Cl. .................. 370/254; 370/401; 370/389

(58) Field of Classification Search .............. 370/327, 370/340, 338, 216, 431, 254, 401, 385.31, 370/395.53, 419, 463, 389
See application file for complete search history.

(56) References Cited

U.S. PATENT DOCUMENTS

| | | | |
|---|---|---|---|
| 4,159,470 A * | 6/1979 | Strojny et al. ............... 714/4 |
| 5,825,772 A | 10/1998 | Dobbins et al. |
| 5,949,788 A * | 9/1999 | Friedman et al. ............ 370/431 |
| 6,016,310 A | 1/2000 | Muller et al. |
| 6,104,696 A | 8/2000 | Kadambi et al. |
| 6,151,297 A * | 11/2000 | Congdon et al. ............ 370/216 |
| 6,496,502 B1 * | 12/2002 | Fite et al. .................... 370/389 |
| 2006/0072554 A1 * | 4/2006 | Farahmand et al. ......... 370/352 |

FOREIGN PATENT DOCUMENTS

WO   WO 99/00950   1/1999

* cited by examiner

*Primary Examiner*—Brian D Nguyen

(57) ABSTRACT

A method and system for automatically trunking ports connecting network devices arranged in a stacked configuration is provided. The method includes sending a packet, from a sending network device to at least one other receiving network device, through each of a plurality of ports of the network device. The packet includes at least an identifier for identifying the sending network device. The receiving network device maintains a table identifying which ports are connected to a neighboring network device. The network device automatically trunks the ports which are connected to the same network device.

6 Claims, 7 Drawing Sheets

HIGH SPEED AUTOTRUNKING

BACKGROUND OF THE INVENTION

1. Field of the Invention

The invention relates to a method and apparatus for high performance switching in local area communications networks such as token ring, ATM, and Ethernet environments, generally known as LANs. In particular, the invention relates to a method and apparatus for automatically trunking ports between devices in a network.

2. Description of the Related Art

Computer networks are commonly used to send and receive data, to share resources, and to provide communication between remote users. As computer performance has increased in recent years, the demands on computer networks has also significantly increased; faster computer processors and higher memory capabilities require networks with high bandwidth capabilities to enable high speed transfer of significant amounts of data. Based upon the Open Systems Interconnect (OSI) 7-layer reference model, network capabilities have grown through the development of devices such as repeaters, bridges, routers, and switches, which operate with various types of communication media. Thickwire, thinwire, twisted pair, and optical fiber are examples of media which has been used for computer networks. The devices may be interconnected by a high speed local data link such as a local area network (LAN), token ring, Ethernet, etc.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular network.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network. The spanning tree algorithm defines a protocol for preventing data loops. Layer three switches, sometimes referred to as routers, can forward packets based upon the destination network address. Layer three switches are capable of learning addresses, maintaining tables thereof which correspond to port mappings, and changing packet data in the process. Processing speed for layer three switches can be improved by utilizing specialized high performance hardware, and off loading the host CPU so that instruction decisions do not delay packet forwarding.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention provides, in one embodiment, a system of interconnected network devices. The network devices convey data across dedicated connections referred to as "stack ports." This configuration will be referred to as a "stack" of network devices, although the physical organization may be a chassis or be highly dispersed. The stack of network devices acts as a single logical network switch with a larger load capacity. Connecting the network devices in a stacked configuration results in the need for discovering what the components of the system are and whether they can communicate with each other. The system should be configured in a manner which allows each of the individual components to communicate with the other components. Therefore, the present invention provides a method and apparatus for dynamic discovery and configuration of network devices in a stacked arrangement.

The network devices of the present invention may be network components with switching and computational capabilities. Additionally, the network devices may be network hardware components capable of generating, receiving and processing packets as will be discussed below. The network devices may have switching and/or routing capabilities appropriate to a local area network (LAN) or other communication network. Furthermore, each of the network devices may include a CPU or CPU functionality, or, alternatively, may be in communication with an external CPU via a CPU interface.

Figure 1:
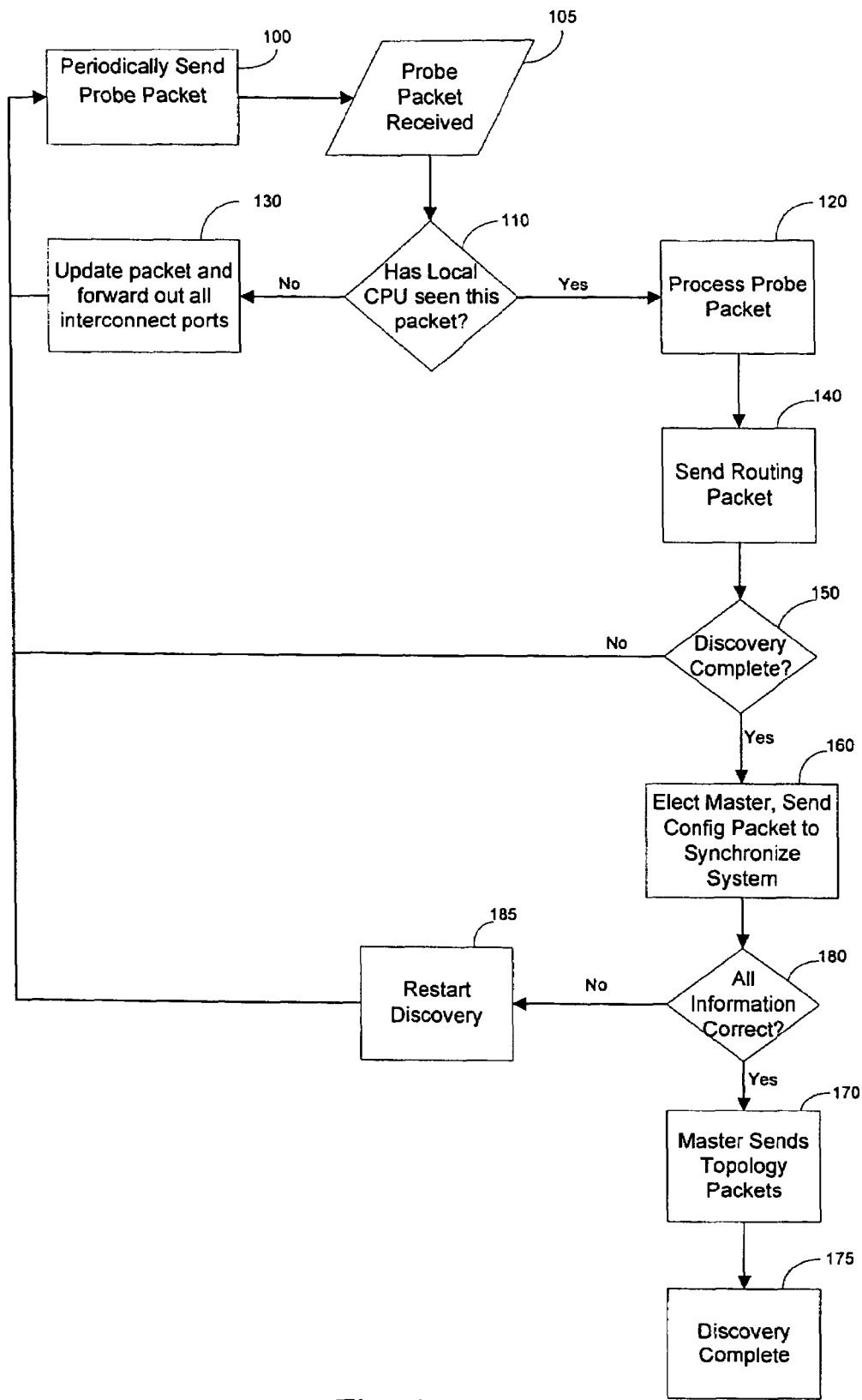
FIG. 1 illustrates a method according to one embodiment of the invention.

FIG. 1 illustrates a method according to one embodiment of the invention. Probe packets are sent out from a network switch to other network switches in the stack 100 via a stack port. The probe packets include at least a tag indicating the transmit port from which the probe packet was sent and the receive port at which the probe packet was received. The data portion of a probe packet may contain a list of entries with the following information: the identifying key of the CPU at this link (key), the index of the stack port on which the packet was received (rx_idx), and the index of the stack port on which the packet was transmitted (tx_idx).

A CPU in each network switch in the stack creates and updates a local database which maintains the information received from each packet which the CPU analyzes. Upon receiving a packet 105, the receiving CPU makes an entry for the sending key in its local database if one does not already exist. It then updates the receive information for the stack port on which the packet was received. The CPU of the receiving switch will then determine whether the switch has previously seen this specific packet 110. If it has (the CPU's own key appears on the list), then the CPU will analyze the data contained in the packet and update its local database accordingly 120. If it has not seen the packet previously, the CPU adds its own information to the end of the list, includes the new tagging information in the probe packet (i.e. transmit and receive ports), and sends the probe packet out all stack ports including the source port of the original packet 130.

Figure 3:
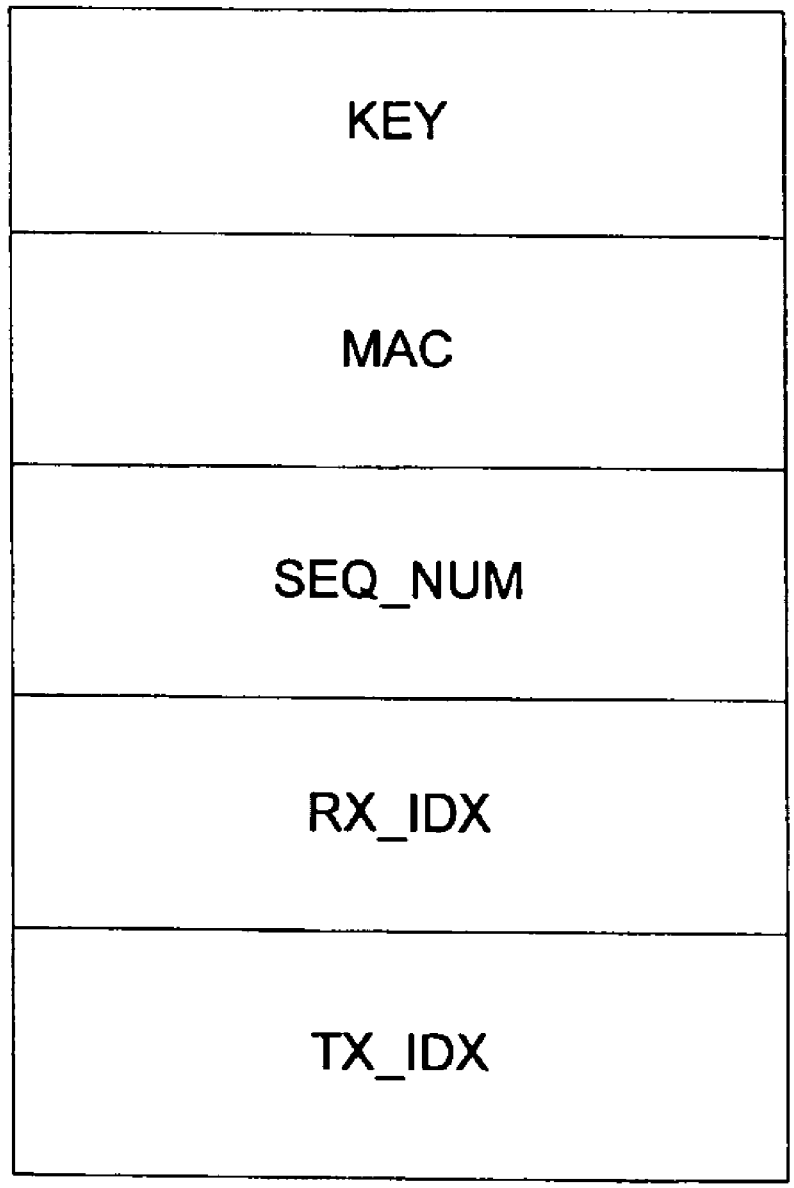
FIG. 3 illustrates a format of probe packet entries according to one embodiment of the invention.

FIG. 3 illustrates a format of the probe packet entries according to one embodiment of the invention. Specifically, the probe packet entry format may be as follows:

---
KEY - The unique key identifying the CPU;
MAC - The MAC address for this CPU;
SEQ_NUM - Discovery sequence number which is assigned on discovery start;
RX_IDX - Index of stack port on which this packet was received;
TX_IDX - Index of stack port on which this packet was transmitted.

---

Next, routing packets are sent from one switch to its neighboring switch 140. The routing packets contain all of the information in the local database of the switch that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

Figure 4:
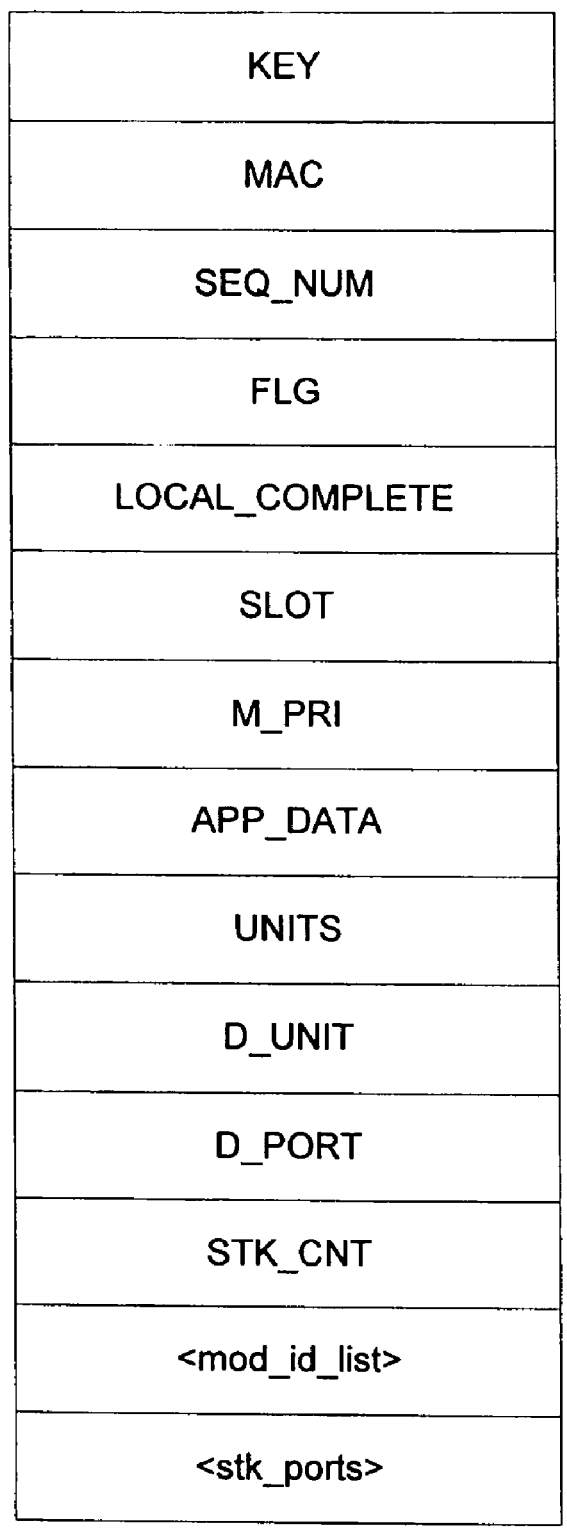
FIG. 4 illustrates a format of routing packet entries according to one embodiment of the invention

FIG. 4 illustrates a format of the routing packet entries according to an embodiment of the invention. The routing packet may include the following entries:

---
KEY - The unique key identifying the CPU;
MAC - This entry's MAC address;
SEQ_NUM - Discovery sequence number;
FLG - Flags;
LOCAL_COMPLETE - KEY knows it has a complete database;
SLOT - Slot ID;
M_PRI - Master priority;
APP_DATA - Application data;
UNITS - Number of switch devices controlled by this CPU;
D_UNIT - 0-based local index of device for addressing CPU;
D_PORT - Destination port for addressing this CPU;
STK_CNT - How many stack port entries follow;
<stk_ports> - One entry per stack port.

---

The method further includes determining whether all of the configuration information is known to all switches in the stack 150. Each local database includes a first indicator for indicating that the local CPU has resolved the local stack port information. A second indicator is also included in each local database for indicating that the local CPU has confirmed that all other CPUs have resolved their local information. A third indicator is also provided in each local database for indicating that the local CPU has confirmed that every other CPU has also confirmed that the other CPUs have resolved their local information. If all of these indicators are positive, each switch has determined that all of the configuration information has been received and resolved by all of the other switches in the stack.

Next, one of the network switches is elected as a central authority, called a master 160. A master priority entry may be included in each database. The master may be elected by comparing the master priority entries of each switch. The switch which has the highest master priority entry will be selected as master. If more than one switch has the highest priority, then the local CPU with the lowest identifier is designated as the master. Configuration packets, containing the key of the master CPU, are sent by the master to each other network device in the system.

The master undertakes the analysis of the configuration information in the database. During the analysis, the master will determine how to avoid loops in the system, and will generate a map or path for every possible pair of connections. The master may undertake the analysis through, for example, graph analysis, loop detection, or path determination. The master will then send the result of the analysis, in topology packets, to all the other network switches in the stack 170. A topology packet is also looped back from the master to itself to allow local programming of devices on the master. The topology packet contains the final configuration information that all of the switches have resolved to use, and also signals the completion of the discovery process 175.

Figure 5:
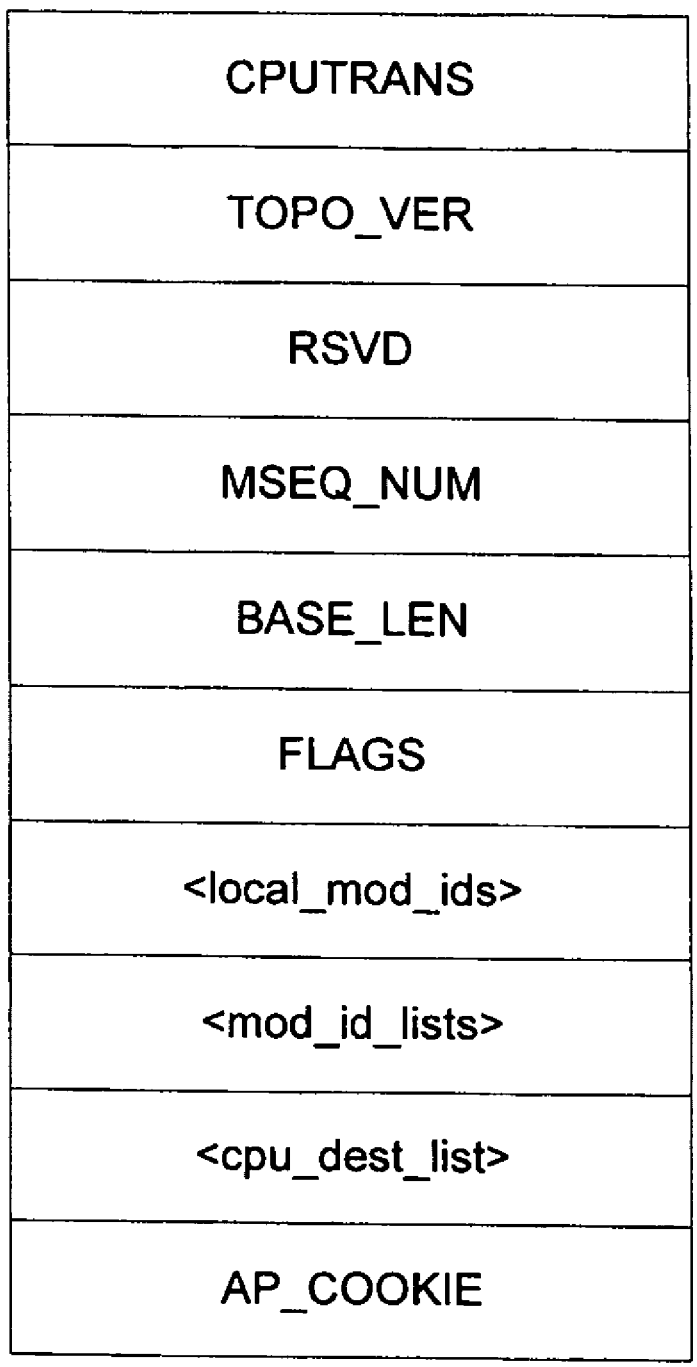
FIG. 5 illustrates a format of topology packet entries according to one embodiment of the invention.

FIG. 5 illustrates a format of the topology packet entries according to an embodiment of the invention. The topology packet may include the following entries:

---
CPUTRANS - Transport header;
TOPO_VER - Topology version number;
RSVD - Reserved byte;
MSEQ_NUM - Sequence number of discovery used by master;
BASE_LEN - Length in bytes of the packet from NUM_STK through AP_COOKIE. This is used for the comparison of topology packets;
FLAGS - flags;
<local-mod-ids> - List of base module IDs to use;
<mod-id-lists> - List of module IDs bound to each stack port;
<cpu-dest-list> - The destination mod ids to use per CPU;
AP_COOKIE - Cookie used by application. By default, it is used in detecting topology changes.

---

The system is synchronized such that all switches in the stack agree that the process is complete 180. Validation is made that the configuration information exchanged is the same across all of the switches. If any discrepancy is detected in any of the databases, a fault is triggered and the process is repeated 185. Additionally, every local database has a discovery sequence number. The sequence number is incremented whenever the CPU has detected a problem. Anytime a problem is detected, the CPU will re-start the process from the beginning. As discussed above, since the local database information is propagated throughout the system, all of the other network switches will also see that there is a problem and reset the process.

Thus, the method described above provides a way for dynamically determining or discovering the interconnections between a system of network switches. The information discovered during this process may include the following: (1) determining the number of CPUs in the system, each identified by a unique MAC address; (2) information about each CPU in the system, including the unique database key identifying the CPU, the number of switch devices controlled by the CPU, the total number of stack ports controlled by the CPU, the total number of module IDs required by all switch devices controlled by the CPU; (3) determining routes to each CPU in the system, including what port in a network device should a packet exit in order to reach a given CPU; (4) generating a map indicating the network device each stack port connects to, for transmit and receive independently; (5) determining the master network device; (6) locally significant CPU references; (7) locally significant device numbers for each switch device in the system; (8) global module ID numbers for each device that requires one; (9) determining the ports that need to be disabled in order to prevent loops from occurring in the system.

Figure 2:
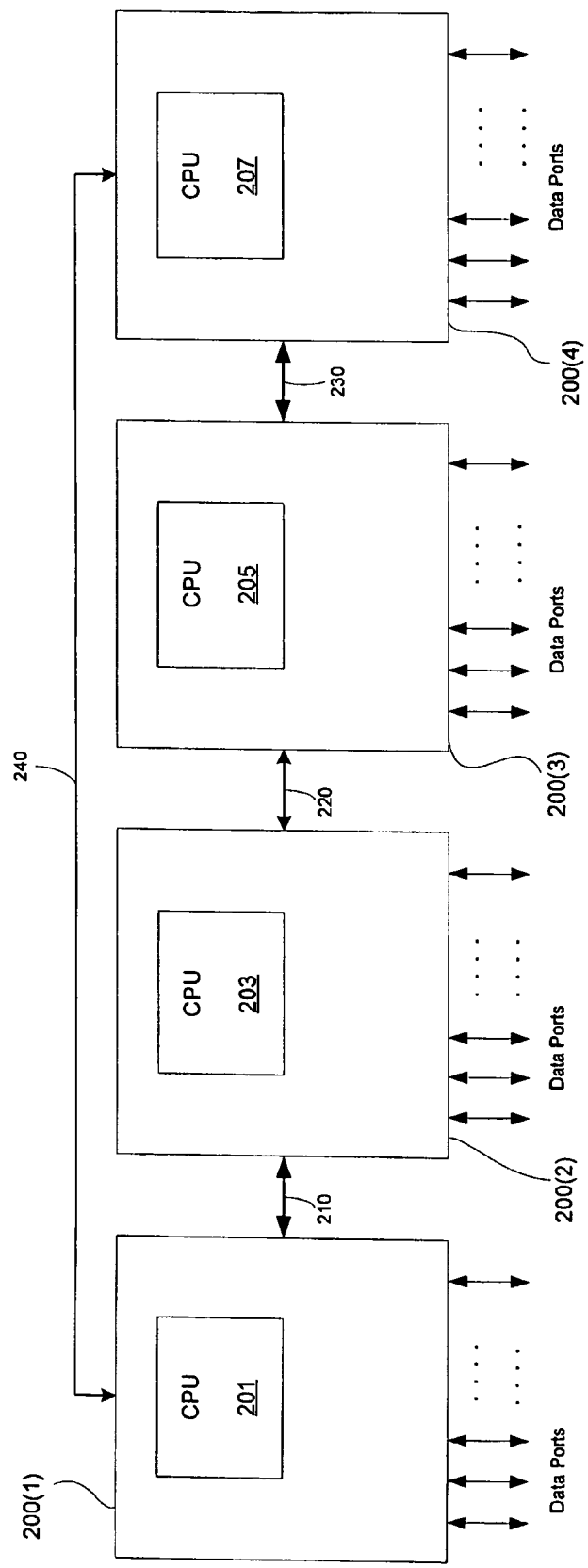
FIG. 2 illustrates a system according to one embodiment of the invention

FIG. 2 illustrates a system according to an embodiment of the present invention. The system includes a stack of network devices 200(1), 200(2), 200(3), 200(4). Four network devices are illustrated, however any number of network devices may be stacked in this configuration. Upon start-up, the system is configured in a manner that guarantees that information can travel from each network device to one of the adjacent or neighboring network devices. The network devices 200(1), 200(2), 200(3), 200(4) are connected to each other via stack ports 210, 220, 230, 240. Each of the network devices 200(1), 200(2), 200(3), 200(4) may include CPUs 201, 203, 205, 207. In addition to the stack ports 210, 220, 230, 240, the network device may include a plurality of data ports for transmitting and receiving data packets.

Upon start-up of the system, each of the network devices 200(1), 200(2), 200(3), 200(4) sends out a probe packet via the stack ports 210, 220, 230, 240 to the adjacent network devices. The probe packet contains a tag indicating the transmit and receive ports used by the probe packet. The CPU of a network device receiving a probe packet will determine whether it has previously seen the particular probe packet. If it has, then it will analyze the information contained in the packet and update a local database, maintained by each CPU, with the information extracted from the probe packet. If the CPU has not previously seen the packet, then it will update the tag of the probe packet and send it on to the next network device. Therefore, the tag of a probe packet according to an embodiment of the present invention may, for example, look like the following: $CPU_1$, $Tx_1$, $CPU_2$, $Rx_2$, $Tx_3$, . . . , $CPU_i$, $Rx_y$, $Tx_z$. According to this example, the probe packet was sent from CPU, on transmit port 1, received by $CPU_2$ on receive port 2, transmitted by $CPU_2$ on transmit port 3, received by $CPU_i$ on receive port y, and transmitted by $CPU_i$ on transmit port z.

Each of the network devices 200(1), 200(2), 200(3), 200(4) will then send out a routing packet via the stack ports 210, 220, 230, 240. The routing packets contain all of the information in the local database of the CPU of the network device that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

One of the network devices in the system can be selected as a master network device. As discussed above, the master network device may be selected by comparing master priority entries in the databases or by comparing identifiers. Configuration packets, containing the key of the master CPU, are sent by the master to each other network device in the system.

The master network device analyzes the configuration information in its local database. As mentioned above, the master is responsible for determining how to avoid loops in the system, and will also generate a map or path for every possible pair of connections. The master network device will then send the result of the analysis, in topology packets, to all the other network switches in the stack. The topology packet contains the final configuration information that all of the switches have resolved to use, and also signals the completion of the discovery process.

Thus, in the manner described, the system of network devices is able to dynamically discover what the components of the system are and how they are interconnected.

According to another embodiment of the invention, a stack of network devices connected via high speed communication ports is provided. The high speed communication ports typically transfer data at a rate of 10 to 12 gigabits per second. However, a situation may arise where more than 12 gigabits per second of data needs to be sent over a data port. In this situation, multiple ports between the network devices may be utilized in order to provide the requisite data capacity. For instance, two ports may be trunked thereby forming a logical port with a higher capacity than any of the individual physical ports.

The trunking of multiple ports requires that the trunk group be set up and initialized properly. If one of the ports or links fails for any reason, each device in the stack should recognize this change and adjust accordingly. As a result, each device should know the number of connections it has with other network devices. If one of those connections fail or the number of connections changes for any reason, then the hashing configuration may change so that the device does not attempt to use the failed connection. Traditionally, a network administrator would monitor the connections between devices and inform the devices of any change manually.

The present invention, however, provides a method and apparatus for automatically trunking ports between network devices and monitoring any link change event that may occur with respect to those connections. As discussed, above, the present invention provides a method and apparatus whereby devices in a stacked configuration dynamically discover the interconnections between them. When a device detects any change in the interconnections, the discovery process can be re-initiated by sending a discovery packet to the other devices in the stack. As a result of the discovery process, each device will have knowledge of the other devices it is connected to and also know through which ports they are connected.

More specifically, according to an embodiment of the invention, when a link change event occurs, the devices in the stack will recognize the change and start the discovery process. A link change event may occur at power-on of the system or when a connection is added or removed between any of the network devices. As discussed above, the discovery process may include, in part, sending a discovery packet from a device to another device in the stack, where the packet includes the identifier of the sending device. The packet may also include a tag identifying the port number on which it was sent. The device receiving the packet will then recognize that a link change event has occurred and will in turn send out its own discovery packet containing its identifier and the port number from which it was sent. In this manner, each device will send out packets including its own identifier and receive packets from other devices containing their identifier. The devices will then be able to compile a list or table which identifies the other devices that they are connected to and also identifies the specific ports that connect them. Therefore, the devices will know which of its ports are connected to the same device and be able to form a trunk group from those ports. The multiple ports in the trunk group are treated as a single logical link. If one of the connections in the trunk group fails, the remaining connections will still be available to send and receive data.

Additionally, when a link change event occurs, any existing trunk groups are destroyed. This is done to ensure that discovery packets, which are sent out after a link change event, will travel across a physical link and not a logical link that is provided by a trunk group.

Furthermore, according to an embodiment of the present invention, one of the ports in a trunk group may be designated as the primary port. For example, the lowest number port in the trunk group may be selected as the primary port. Moreover, when a packet comes in that is destined for another device that is connected to the sending device via a trunk group, the sending device will automatically hash the packet across the ports in the trunk group and load balance across those ports.

Figure 6:
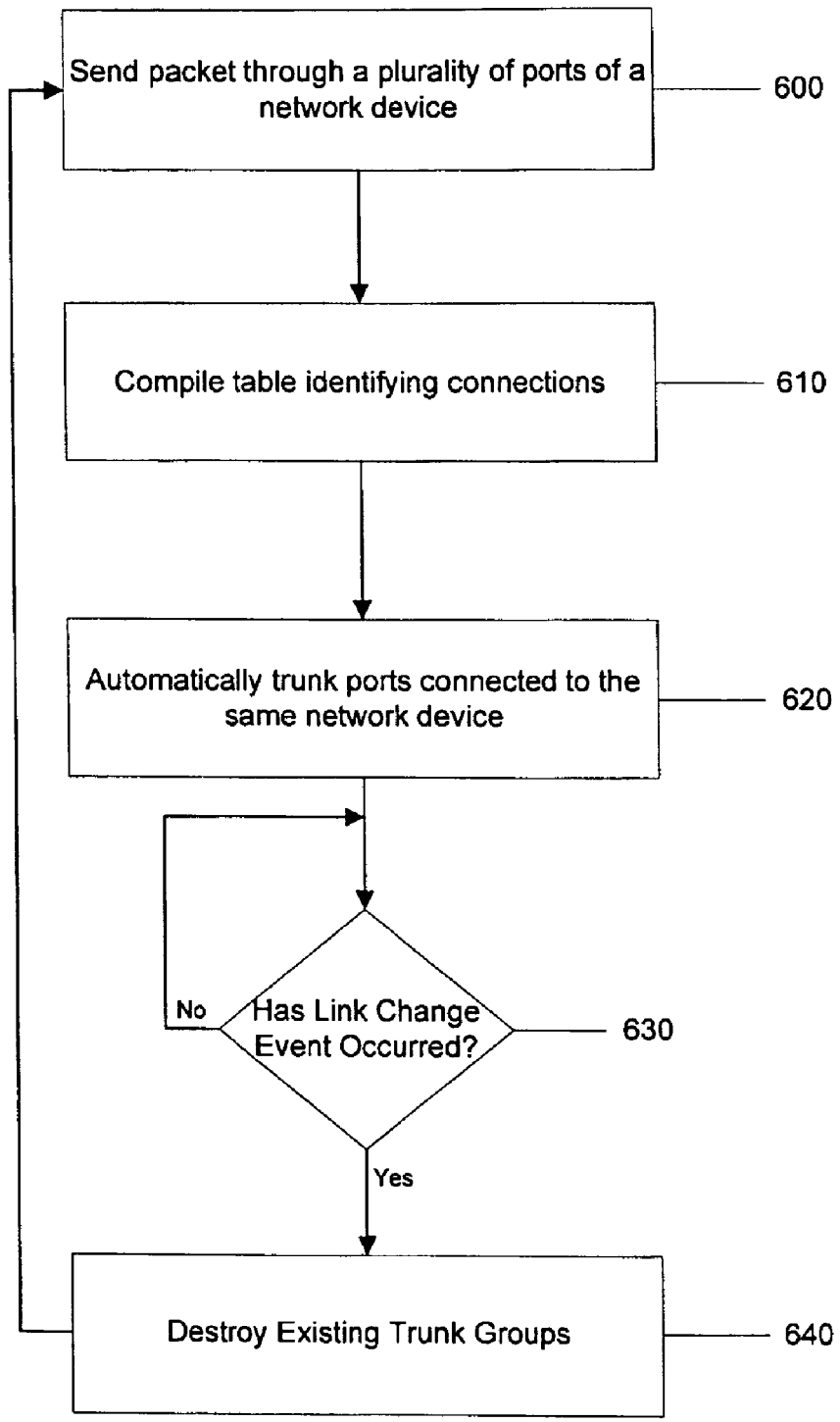
FIG. 6 illustrates a method according to another embodiment of the invention.

FIG. 6 illustrates a method of automatically trunking ports according to one embodiment of the invention. The method includes the steps of sending a packet, from a sending network device to a receiving network device, through each of a plurality of ports of the network device 600. The packet may include an identifier for identifying the sending network device. The method further includes the steps of compiling, at the receiving network device, a table identifying which ports are connected to a neighboring network device 610, and automatically trunking the ports which are connected to the same network device 620. The method also includes the step of automatically recognizing when a link change event occurs 630. If a link change event has occurred, the existing trunk groups are destroyed and the process is restarted 640.

Figure 7:
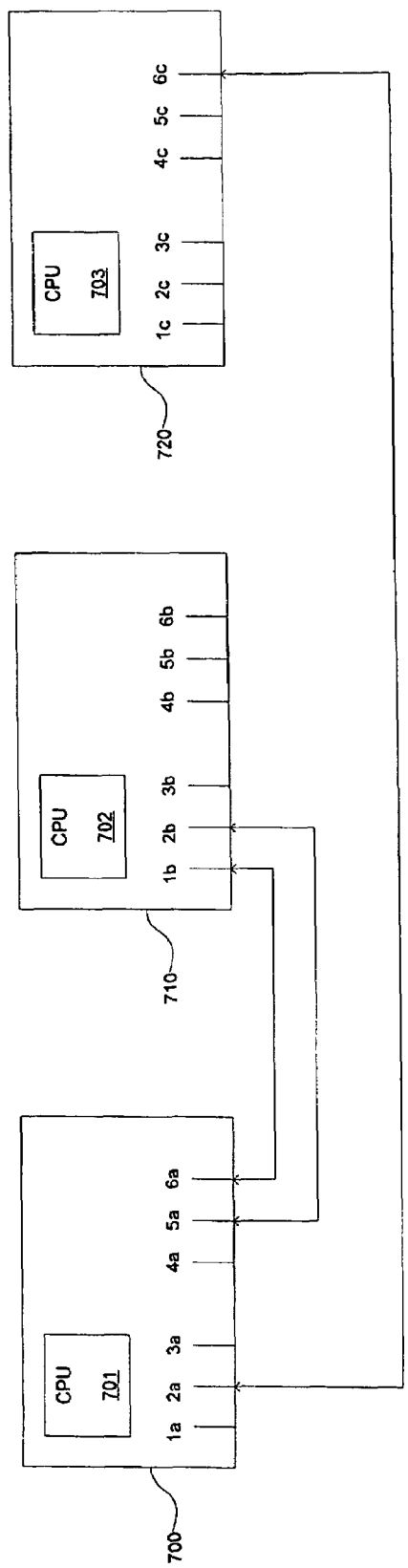
FIG. 7 illustrates a system according to another embodiment of the invention.

FIG. 7 illustrates one example of a system of network devices 700, 710, 720 according to an embodiment of the invention. Three devices are illustrated, but any number of devices may be included and the invention is not limited to this configuration. Each of the network devices 700, 710, 720 may include a CPU 701, 702, 703 therein. Additionally, the devices 700, 710, 720 may include a plurality of ports 1a-6a, 1b-6b, 1c-6c. Although each device is illustrated as having six ports, the devices may have any number of ports.

Further, FIG. 7 illustrates an example of possible connections between the network devices. FIG. 7 only illustrates one possibility of connections between the network devices, but any of a myriad of connections can be made and the invention is in no way limited to this example. According to the example of FIG. 7, network device 700 is connected to network device 710 via ports 5a and 6a, and is connected to network device 720 via port 2a. Network device 700 sends out packets via ports 5a, 6a, and 2a. The packet includes a tag identifying the sending network device and the port on which the packet was sent. Network device 710 receives a packet from network device 700 on each of ports 1b and 2b. In this manner, network device 710 will know that ports 1b and 2b are both connected to device 700. Network device 710 will compile a list or table identifying all of the connections and trunk the ports that are connected to the same network device. In this example, network device 710 will trunk ports 1b and 2b, which are both connected to network device 700, thereby creating a logical port with a larger load capacity. Similarly, network device 700 will receive packets from network device 710. The packets are sent from ports 1b and 2b of device 710 and received on ports 6a and 5a of device 700. Network device 700 identifies that ports 5a and 6a are both connected to device 710 and will automatically trunk ports 5a and 6a. Network device 730 will not trunk any of its ports because it does not have two or more connections to the same device.

Thus, according to the embodiment discussed above and illustrated in FIG. 7, when a packet in network device 700 is destined for network device 710, it will automatically be hashed across ports 5a and 6a resulting in a larger load capacity and better performance.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of automatically trunking ports connecting network devices, the method comprising:
   receiving a packet, from a sending network device in at least one receiving network device, through each of a plurality of ports of the network device;
   compiling, at the at least one receiving network device, a table identifying which ports are connected to a neighboring network device;
   automatically trunking the ports which are connected to a same network device;
   recognizing when a link change event has occurred;
   re-initiating the automatic trunking of the ports when said link change event has occurred,
   destroying any existing trunk groups when said link change event has occurred; and
   wherein the packet comprises an identifier for identifying the sending network device.

2. The method of claim 1, wherein the link change event comprises at least one of power-on of the network device, connecting at least one of the plurality of ports, disconnecting at least one of the plurality of ports, and a failure of at least one of the plurality of ports.

3. A network device, comprising:
   a plurality of ports connected to at least one other network device; and
   at least one central processing unit (CPU) interface configured to communicate with a CPU to maintain a table identifying the ports connecting the network device to the at least one other network device;
   wherein the network device is configured to automatically trunk the ports which are connected to a same network device, wherein the network device is configured to recognize when a link change event has occurred, and wherein the network device is configured to re-initiate the automatic trunking of the ports when said link change event has occurred, and wherein the network device is configured to destroy any existing trunk groups when said link change event has occurred.

4. The network device of claim 3, wherein the link change event comprises at least one of power-on of the network device, connecting at least one of the plurality of ports, disconnecting at least one of the plurality of ports, and a failure of at least one of the plurality of ports.

5. A network device, comprising:
   sending means for sending a packet to at least one other receiving network device, through each of a plurality of ports of the network device;
   compiling means for compiling a table identifying which ports are connected to a neighboring network device; and
   trunking means for automatically trunking the ports which are connected to a same network device;
   recognizing means for recognizing when a link change event has occurred;
   re-initiating means for re-initiating the automatic trunking of the ports when said link change event has occurred; and
   destroying means for destroying any existing trunk groups when said link change event has occurred,
   wherein the packet comprises an identifier for identifying the sending network device.

6. The network device of claim 5, wherein the link change event comprises at least one of power-on of the network device, connecting at least one of the plurality of ports, disconnecting at least one of the plurality of ports, and a failure of at least one of the plurality of ports.

* * * * *